United States Patent
Kato

(10) Patent No.: US 7,701,306 B2
(45) Date of Patent: Apr. 20, 2010

(54) ERROR CORRECTION SIGNAL GENERATING DEVICE AND ORTHOGONAL MODULATOR EQUIPPED WITH THE ERROR CORRECTION SIGNAL GENERATING DEVICE

(75) Inventor: Takashi Kato, Saitama (JP)

(73) Assignee: Advantest Corporation, Tokyo (JP)

( * ) Notice: Subject to any disclaimer, the term of this patent is extended or adjusted under 35 U.S.C. 154(b) by 1001 days.

(21) Appl. No.: 10/571,529

(22) PCT Filed: Sep. 9, 2004

(86) PCT No.: PCT/JP2004/013490

§ 371 (c)(1),
(2), (4) Date: May 9, 2006

(87) PCT Pub. No.: WO2005/027449

PCT Pub. Date: Mar. 24, 2005

(65) Prior Publication Data

US 2007/0030922 A1 Feb. 8, 2007

(30) Foreign Application Priority Data

Sep. 11, 2003 (JP) ............................. 2003-319719

(51) Int. Cl.
*H04L 27/20* (2006.01)
(52) U.S. Cl. ...................................... 332/105; 332/103
(58) Field of Classification Search .................. 332/105, 332/103
See application file for complete search history.

(56) References Cited

U.S. PATENT DOCUMENTS 4,398,161 A 8/1983 Lamb et al.
5,019,793 A 5/1991 McNab
5,469,126 A * 11/1995 Murtojarvi .................. 332/105

FOREIGN PATENT DOCUMENTS

EP 0823747 2/1998
JP 55-162611 12/1980
JP 57-97237 6/1982

(Continued)

OTHER PUBLICATIONS

English Language Abstract of JP 2000-69097.
English Language Abstract of JP 63-4721.
English Language Abstract of JP 55-162611.

(Continued)

*Primary Examiner*—Joseph Chang
(74) *Attorney, Agent, or Firm*—Greenblum & Bernstein PLC

(57) ABSTRACT

An offset errors of a quadrature modulator is corrected. A device including a first correction signal output unit (50) for outputting a first correction signal based upon a local signal (phase: 0°) from a 180°-phase amplifier (27) or a phase shift local signal (phase: 180°) from a 180°-phase amplifier (23), a second correction signal output unit (60) for outputting a second correction signal based upon an orthogonal local signal (phase: 90°) from a 180°-phase amplifier (37) or an orthogonal phase shift local signal (phase: 270°) from a 180°-phase amplifier (33), and a correction signal output unit (70) for outputting a correction signal based upon the first and second correction signals, wherein a correction signal is further added to outputs from an I signal mixer (42) and a Q signal mixer (44) by an adder (46) resulting in correcting offset errors of the quadrature modulation.

12 Claims, 1 Drawing Sheet

FOREIGN PATENT DOCUMENTS

| | | |
|---|---|---|
| JP | 63-4721 | 1/1988 |
| JP | 1-305709 | 12/1989 |
| JP | 3-198401 | 8/1991 |
| JP | 6-177929 | 6/1994 |
| JP | 6-197137 | 7/1994 |
| JP | 6-268466 | 9/1994 |
| JP | 7-312623 | 11/1995 |
| JP | 2000-69097 | 3/2000 |

OTHER PUBLICATIONS

English Language Abstract of JP6-197137.
English Language Abstract of JP 6-268466.
English Language Abstract of JP 7-312623.
English Language Abstract of JP 1-305709.
English Language Abstract of JP 6-177929.
U.S. Appl. No. 10/549,629 to Kato.
English Language Abstract of JP 3-198401.

* cited by examiner

ERROR CORRECTION SIGNAL GENERATING DEVICE AND ORTHOGONAL MODULATOR EQUIPPED WITH THE ERROR CORRECTION SIGNAL GENERATING DEVICE

TECHNICAL FIELD

The present invention relates to a correction of initial offset errors such as those of a quadrature modulator.

BACKGROUND ART

Conventionally, there has been used a quadrature modulator for the quadrature modulation of an I signal and a Q signal, namely baseband signals. A quadrature modulator is provided with an I signal multiplier which receives the I signal, a Q signal multiplier which receives the Q signal, and an adder. The I signal multiplier multiplies the I signal and a local signal for the I signal, and outputs a result of the multiplication. The Q signal multiplier multiplies the Q signal and a local signal for the Q signal (signal obtained by shifting the local signal for the I signal by 90 degrees), and outputs a result of the multiplication. The adder adds the output of the I signal multiplier and the output of the Q signal multiplier, and outputs a result of the addition. The output of the adder is an RF (Radio Frequency) signal obtained as a result of the quadrature modulation of the baseband signals.

However, the quadrature modulator presents initial offset errors. Namely, the RF signal presents errors in the phase and the amplitude.

In order to eliminate the errors in the phase and the amplitude generated in the RF signal, a patent document 1 (Japanese Laid-Open Patent Publication (Kokai) No. 2000-69097) describes a configuration where one quadrature modulator is additionally provided to eliminate the errors. Namely, an output of the quadrature modulator used for the error elimination is added to an output of the quadrature modulator used for the quadrature modulation to eliminate the errors in the phase and the amplitude generated in the RF signal.

However, upon using the above error elimination method, it is necessary to use two quadrature modulators. The multiplier provided for the quadrature modulator is expensive, and a cost to eliminate the errors thus increases accordingly.

In view of the foregoing problem, an object of the present invention is to correct offset errors of a quadrature modulator and the like without additionally providing a quadrature modulator for error elimination.

DISCLOSURE OF THE INVENTION

According to an aspect of the present invention, an error correction signal generating device includes: a local signal outputting unit that outputs a local signal; an orthogonal local signal outputting unit that outputs an orthogonal local signal obtained by shifting the phase of the local signal by 90 degrees; a phase shift local signal outputting unit that outputs a phase shift local signal obtained by shifting the phase of the local signal by 180 degrees; an orthogonal phase shift local signal outputting unit that outputs an orthogonal phase shift local signal obtained by shifting the phase of the orthogonal local signal by 180 degrees; a first correction signal outputting unit that outputs a first correction signal based upon the local signal or the phase shift local signal; a second correction signal outputting unit that outputs a second correction signal based upon the orthogonal local signal or the orthogonal phase shift local signal; and a correction signal outputting unit that outputs a correction signal based upon the first correction signal and the second correction signal.

According to the thus constructed error correction signal generating device of the present invention, a local signal outputting unit outputs a local signal. An orthogonal local signal outputting unit outputs an orthogonal local signal obtained by shifting the phase of the local signal by 90 degrees. A phase shift local signal outputting unit outputs a phase shift local signal obtained by shifting the phase of the local signal by 180 degrees. An orthogonal phase shift local signal outputting unit outputs an orthogonal phase shift local signal obtained by shifting the phase of the orthogonal local signal by 180 degrees. A first correction signal outputting unit outputs a first correction signal based upon the local signal or the phase shift local signal. A second correction signal outputting unit outputs a second correction signal based upon the orthogonal local signal or the orthogonal phase shift local signal. A correction signal outputting unit outputs a correction signal based upon the first correction signal and the second correction signal.

According to the error correction signal generating device of the present invention, the phase shift local signal outputting unit or the orthogonal phase shift local signal outputting unit may be an element that causes the phase of an input signal and the phase of an output signal to have a certain difference in phase regardless of the frequency of the input signal.

According to the error correction signal generating device of the present invention, the element may be an amplifier or a balun.

According to the error correction signal generating device of the present invention, the first correction signal outputting unit may include: a first correction signal passing unit that passes the first correction signal; a local signal switching unit that determines whether the local signal is to be passed to the first correction signal passing unit; a phase shift local signal switching unit that determines whether the phase shift local signal is to be passed to the first correction signal passing unit; and a first switching control unit that sets either the local signal switching unit or the phase shift local signal switching unit in a conductive state, and the second correction signal outputting unit may include: a second correction signal passing unit that passes the second correction signal; an orthogonal local signal switching unit that determines whether the orthogonal local signal is to be passed to the second correction signal passing unit; an orthogonal phase shift local signal switching unit that determines whether the orthogonal phase shift local signal is to be passed to the second correction signal passing unit; and a second switching control unit that sets either the orthogonal local signal switching unit or the orthogonal phase shift local signal switching unit in a conductive state.

According to the error correction signal generating device of the present invention, the local signal switching unit, the phase shift local signal switching unit, the orthogonal local signal switching unit, and the orthogonal phase shift local signal switching unit may be variable resistor elements.

According to the error correction signal generating device of the present invention, the local signal switching unit, the phase shift local signal switching unit, the orthogonal local signal switching unit, and the orthogonal phase shift local signal switching unit may be PIN diodes or variable attenuators.

According to the error correction signal generating device of the present invention, if the resistance of the local signal switching unit or the phase shift local signal switching unit is r1, and the resistance of the orthogonal local signal switching unit or the orthogonal phase shift local signal switching unit is r2, r1=C/sin θ, and r2=C/cos θ (C is a constant, and 0°<θ<90°).

According to the error correction signal generating device of the present invention, if the resistance of the local signal switching unit or the phase shift local signal switching unit is r1, and the resistance of the orthogonal local signal switching unit or the orthogonal phase shift local signal switching unit is r2, r1=C/sin² θ, and r2=C/cos² θ (C is a constant, and 0°<θ<90°).

According to the error correction signal generating device of the present invention, the correction signal outputting unit may be connected to the first correcting signal passing unit and the second correction signal passing unit.

According to the present invention, an error correction signal generating device may includes: a first correction signal outputting unit that outputs a first correction signal based upon a local signal or a phase shift local signal obtained by shifting the phase of the local signal by 180 degrees; a second correction signal outputting unit that outputs a second correction signal based upon an orthogonal local signal obtained by shifting the phase of the local signal by 90 degrees or an orthogonal phase shift local signal obtained by shifting the phase of the orthogonal local signal by 180 degrees; and a correction signal outputting unit that outputs a correction signal based upon the first correction signal and the second correction signal.

According to the present invention, a quadrature modulator provided with the error correction signal generating device may include: an I signal multiplying unit that multiplies the local signal and an I signal; a Q signal multiplying unit that multiplies the orthogonal local signal and a Q signal; and an adding unit that adds an output from the I signal multiplying unit, an output from the Q signal multiplying unit, and the correction signal, and outputs a result of the addition.

BEST MODE FOR CARRYING OUT THE INVENTION

Figure 1:
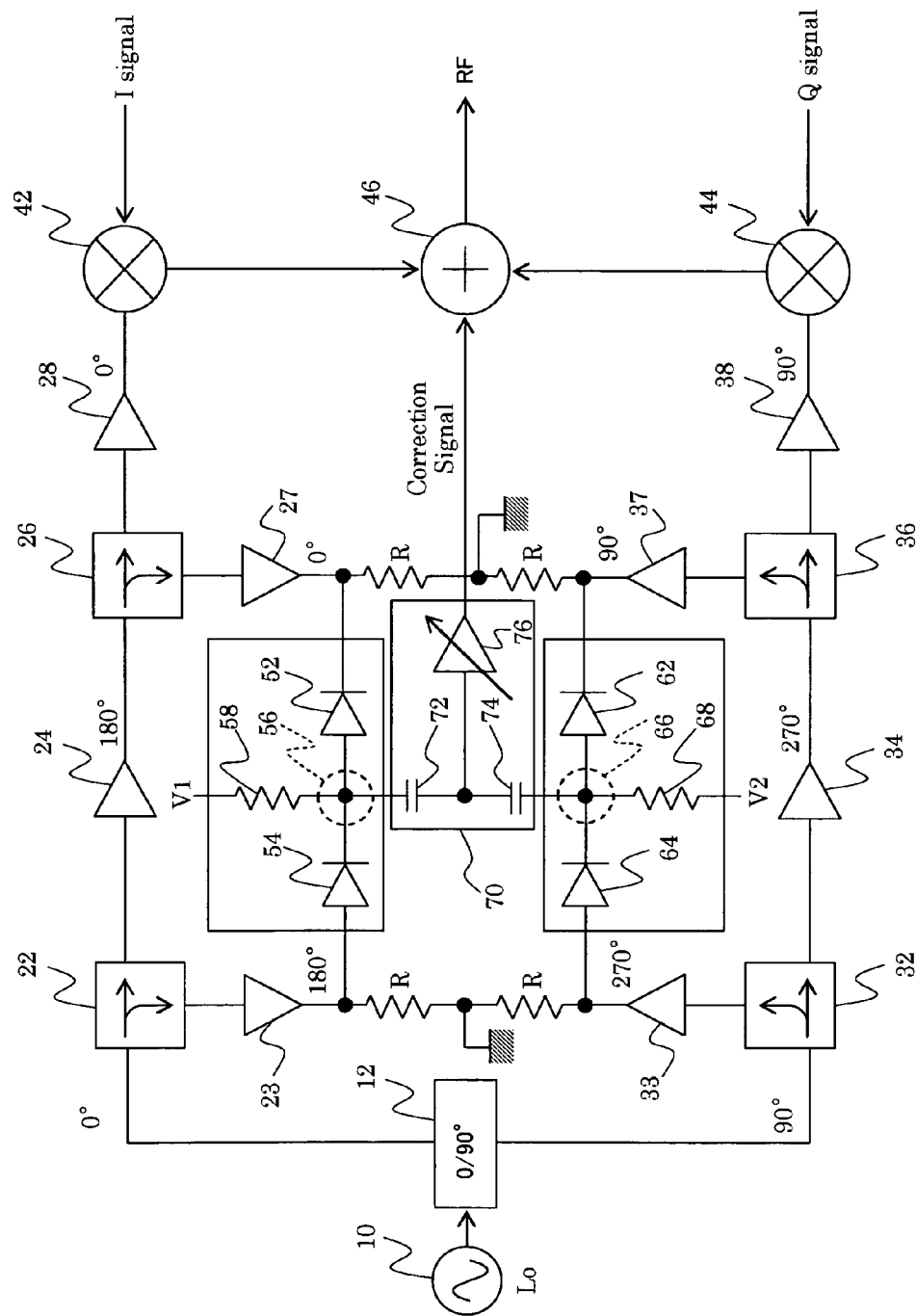
FIG. 1 is a circuit diagram showing a configuration of a quadrature modulator 1 according the embodiment of the present invention.

A description will now be given of an embodiment of the present invention with reference to drawings.

FIG. 1 is a circuit diagram showing a configuration of a quadrature modulator 1 according the embodiment of the present invention. The quadrature modulator 1 is provided with a local oscillator 10, a 90°-phase shifter (orthogonal local signal outputting means) 12, dividers 22, 32, a 180°-phase amplifier (phase shift local signal outputting means) 23, a 180°-phase amplifier (orthogonal phase shift local signal outputting means) 33, 180°-phase amplifiers 24, 34, dividers 26, 36, 180°-phase amplifiers 27, 37, 180°-phase amplifiers 28, 38, an I signal mixer 42, a Q signal mixer 44, an adder 46, a first correction signal output unit 50, a second correction signal output unit 60, and a correction signal output unit 70.

It should be noted that the local oscillator 10, the 90°-phase shifter (orthogonal local signal outputting means) 12, the dividers 22, 32, the 180°-phase amplifier (phase shift local signal outputting means) 23, the 180°-phase amplifier (orthogonal phase shift local signal outputting means) 33, the 180°-phase amplifiers 24, 34, the dividers 26, 36, the 180°-phase amplifiers 27, 37, the first correction signal output unit 50, the second correction signal output unit 60, and the correction signal output unit 70 are considered as an error correction signal generating device that outputs a signal used to correct initial offset errors (origin offsets) of the quadrature modulator 1.

The local oscillator 10 generates a local signal Lo.

The 90°-phase shifter 12 (orthogonal local signal outputting means) receives the local signal Lo from the local oscillator 10, and outputs the local signal Lo directly and an orthogonal local signal obtained by shifting the phase of the local signal Lo by 90 degrees. When the phase of the local signal Lo is 0°, the phase of the orthogonal local signal is 90°. It should be noted that a phase upon the phase of the local signal Lo being 0° is simply represented as a phase X°.

The divider 22 receives the local signal Lo from the 90°-phase shifter 12, divides the local signal Lo, and outputs the divided signals respectively to the 180°-phase amplifiers 23 and 24. The divider 32 receives the orthogonal local signal from the 90°-phase shifter 12, divides the orthogonal local signal, and outputs the divided signals respectively to the 180°-phase amplifiers 33 and 34.

The 180°-phase amplifier (phase shift local signal outputting means) 23 receives the local signal Lo from the divider 22, amplifies the local signal Lo while shifting the phase thereof by 180 degrees, and outputs a resulting signal. The signal obtained by shifting the phase of the local signal Lo by 180 degrees is referred to as phase shift local signal (phase: 180°). The 180°-phase amplifier (orthogonal phase shift local signal outputting means) 33 receives the orthogonal local signal from the divider 32, amplifies the orthogonal local signal while shifting the phase thereof by 180 degrees, and outputs a resulting signal. The signal obtained by shifting the phase of the orthogonal local signal by 180 degrees is referred to as orthogonal phase shift local signal (phase: 270°). It should be noted that the 180°-phase amplifiers 23, 33 may not be amplifiers as long as they shift the phase by 180 degrees. For example, a balun may be used as a substitution thereof. Namely there may be used an element which, regardless of the frequency of an input signal or an output signal, causes the phase of the input signal and the phase of the output signal to be different by a certain amount. Moreover, the outputs of the 180°-phase amplifiers 23, 33 are grounded via resistors R.

The 180°-phase amplifier 24 receives the local signal Lo from the divider 22, amplifies the local signal Lo while shifting the phase thereof by 180 degrees, and outputs a resulting signal. The phase of the output signal is 180°. The 180°-phase amplifier 34 receives the orthogonal local signal from the divider 32, amplifies the orthogonal local signal while shifting the phase thereof by 180 degrees, and outputs a resulting signal. The phase of the output signal is 270°. It should be noted that the 180°-phase amplifiers 24, 34 may not be amplifiers as long as they shift the phase by 180 degrees. For example, a balun may be used as a substitution thereof Namely there may be used an element which, regardless of the frequency of an input signal or an output signal, causes the phase of the input signal and the phase of the output signal to be different by a certain amount.

The divider 26 receives the output of the 180°-phase amplifier 24, and divides the output to output to the 180°-phase amplifiers 27 and 28. The divider 36 receives the output of the 180°-phase amplifier 34, and divides the output to output to the 180°-phase amplifiers 37 and 38.

The 180°-phase amplifier 27 receives the output of the divider 26, amplifies the output while shifting the phase thereof by 180 degrees, and outputs a resulting signal. The phase of the output of the divider 26 is 180°, and is further shifted by the 180°-phase amplifier 27 by 180°. As a result, the phase becomes 0°. The output of the 180°-phase amplifier 27 is thus the local signal Lo.

The 180°-phase amplifier 37 receives the output of the divider 36, amplifies the output while shifting the phase thereof by 180 degrees, and outputs a resulting signal. The phase of the output of the divider 36 is 270°, and is further shifted by the 180°-phase amplifier 37 by 180°. As a result, the phase becomes 90°. The output of the 180°-phase amplifier 37 is thus the orthogonal local signal.

It should be noted that the 180°-phase amplifiers 27, 37 may not be amplifiers as long as they shift the phase by 180 degrees. For example, a balun may be used as a substitution thereof. Namely there may be used an element which, regardless of the frequency of an input signal or an output signal, causes the phase of the input signal and the phase of the output signal to be different by a certain amount. Moreover, the outputs of the 180°-phase amplifiers 27, 37 are grounded via resistors R.

The 180°-phase amplifier 28 receives the output (phase: 180°) of the divider 26, amplifies the output while shifting the phase thereof by 180 degrees, and outputs a resulting signal. The phase of the output signal is 0°. Namely, the local signal Lo is output. The 180°-phase amplifier 34 receives the output (phase: 270°) of the divider 36, amplifies the output while shifting the phase thereof by 180 degrees, and outputs a resulting signal. The phase of the output signal is 90°. Namely, the orthogonal local signal is output. It should be noted that the 180°-phase amplifiers 28, 38 may not be amplifiers as long as they shift the phase by 180 degrees. For example, a balun may be used as a substitution thereof. Namely there may be used an element which, regardless of the frequency of an input signal or an output signal, causes the phase of the input signal and the phase of the output signal to be different by a certain amount.

The I signal mixer 42 multiplies the local signal Lo output by the 180°-phase amplifier 28 and an I signal of baseband signals, and outputs a result of the multiplication.

The Q signal mixer 44 multiplies the orthogonal local signal output by the 180°-phase amplifier 38 and a Q signal of the baseband signals, and outputs a result of the multiplication.

The adder 46 adds respective outputs of the I signal mixer 42, the Q signal mixer 44, and the correction signal output unit 70, and outputs a result of the addition. The output of the adder 46 is to be an RF (Radio Frequency) signal output by the quadrature modulator 1.

The first correction signal output unit 50 receives the local signal from the 180°-phase amplifier 27 and the phase shift local signal from the 180°-phase amplifier 23. The first correction signal output unit 50 then outputs a first correction signal based upon the local signal or the phase shift local signal.

The first correction signal output unit 50 includes a PIN diode (local signal switching means) 52, a PIN diode (phase shift local signal switching means) 54, a joint section (first correction signal passing means) 56, and a control current receiving resistor (first switching control means) 58.

The PIN diode (local signal switching means) 52 is connected to the 180°-phase amplifier 27 on one end, and is connected to the joint section 56 on the other end. The PIN diode 52 determines whether the local signal is to be passed to the joint section 56 or not. Namely, when a current is caused to flow from the other end (joint section 56 side) to the one end (180°-phase amplifier 27 side), the local signal is caused to pass to the joint section 56.

The PIN diode (phase shift local signal switching means) 54 is connected to the 180°-phase amplifier 23 on one end, and is connected to the joint section 56 on the other end. The PIN diode 54 determines whether the phase shift local signal is to be passed to the joint section 56 or not. Namely, when a current is caused to flow from the one end (180°-phase amplifier 23 side) to the other end (joint section 56 side), the phase shift local signal is caused to pass to the joint section 56.

The resistor r of the PIN diodes 52 and 54 is approximated as $r=a/i^b$. It should be noted that i denotes a control current to be flowed through the PIN diodes 52 and 54, and a and b are constants specific to the PIN diodes 52 and 54.

The joint section (first correction signal passing means) 56 is a section where the PIN diodes 52 and 54 are joined. A signal which has passed the PIN diode 52 or 54 (referred to as a first correction signal) passes the joint section 56. The first correction signal which passes the joint section 56 is supplied to the correction signal output unit 70.

The control current receiving resistor (first switching control means) 58 is connected to the joint section 56 on one end, and is connected to a power supply V1 on the other end. The control current receiving resistor 58 sets either the PIN diode 52 or 54 to be the conductive state according to a control current which flows through the control current receiving resistor 58. Namely, when the electric potential of the power supply V1 is positive, the control current flows from the other end (power supply V1 side) to the one end (joint section 56 side) of the control current receiving resistor 58, and the control current flows from the other end (joint section 56 side) to the one end (180°-phase amplifier 27 side) of the PIN diode 52. As a result, the PIN diode 52 is set to the conductive state, and the local signal is to be passed to the joint section 56. Moreover, when the electric potential of the power supply V1 is negative, the control current flows from the one end (joint section 56 side) to the other end (power supply V1 side) of the control current receiving resistor 58, and the control current flows from the one end (180°-phase amplifier 23 side) to the other end (joint section 56 side) of the PIN diode 54. As a result, the PIN diode 54 is set to the conductive state, and the phase shift local signal is to be passed to the joint section 56.

It should be noted that the control currents which flow through the PIN diodes 52 and 54 preferably set the resistance of the PIN diodes 52 and 54 to $C/\sin\theta$ or $C/\sin^2\theta$ (C is a constant, and 0°<θ<90°). Since the resistance of the PIN diodes 52 and 54 is represented as $r=a/i^b$, the control current is preferably set to $|I \sin^{-b}\theta|$ or $|I \sin^{-2b}\theta|$.

If the resistance can be set as described above, and the conductive/non-conductive states can be determined as well, in place of the PIN diodes 52 and 54, a variable resistance element (variable attenuator, for example) may be used.

The second correction signal output unit 60 receives the orthogonal local signal from the 180°-phase amplifier 37 and the orthogonal phase shift local signal from the 180°-phase amplifier 33. The second correction signal output unit 60 then outputs a second correction signal based upon the orthogonal local signal or the orthogonal phase shift local signal.

The second correction signal output unit 60 includes a PIN diode (orthogonal local signal switching means) 62, a PIN diode (orthogonal phase-shift local signal switching means) 64, a joint section (second correction signal passing means) 66, and a control current receiving resistor (second switching control means) 68.

The PIN diode (orthogonal local signal switching means) 62 is connected to the 180°-phase amplifier 37 on one end, and is connected to the joint section 66 on the other end. The PIN diode 62 determines whether the orthogonal local signal is to be passed to the joint section 66 or not. Namely, when a current is caused to flow from the other end (joint section 66 side) to the one end (180°-phase amplifier 37 side), the orthogonal local signal is caused to pass to the joint section 66.

The PIN diode (orthogonal local signal switching means) 64 is connected to the 180°-phase amplifier 33 on one end, and is connected to the joint section 66 on the other end. The PIN diode 64 determines whether the orthogonal phase shift local signal is to be passed to the joint section 66 or not. Namely, when a current is caused to flow from the one end (180°-phase amplifier 33 side) to the other end (joint section 66 side), the orthogonal phase shift local signal is caused to pass to the joint section 66.

The resistance r of the PIN diodes 62 and 64 is approximated as $r=a/i^b$. It should be noted that i denotes a control current to be flowed through the PIN diodes 62 and 64, and a and b are constants specific to the PIN diodes 62 and 64.

The joint section (second correction signal passing means) 66 is a section where the PIN diodes 62 and 64 are joined. A signal which has passed the PIN diode 62 or 64 (referred to as a second correction signal) passes the joint section 66. The second correction signal which passes the joint section 66 is supplied to the correction signal output unit 70.

The control current receiving resistor (second switching control means) 68 is connected to the joint section 66 on one end, and is connected to a power supply V2 on the other end. The control current receiving resistor 68 sets either the PIN diode 62 or 64 to be a conductive state according to a control current which flows through the control current receiving resistor 68. Namely, when the electric potential of the power supply V2 is positive, the control current flows from the other end (power supply V2 side) to the one end (the joint section 66 side) of the control current receiving resistor 68, and the control current flows from the other end (joint section 66 side) to the one end (180°-phase amplifier 37 side) of the PIN diode 62. As a result, the PIN diode 62 is set to the conductive state, and the orthogonal local signal is to be passed to the joint section 66. Moreover, when the electric potential of the power supply V2 is negative, the control current flows from the one end (joint section 66 side) to the other end (power supply V2 side) of the control current receiving resistor 68, and the control current flows from the one end (180°-phase amplifier 33 side) to the other end (joint section 66 side) of the PIN diode 64. As a result, the PIN diode 64 is set to the conductive state, and the orthogonal phase shift local signal is to be passed to the joint section 66.

It should be noted that the control currents which flow through the PIN diodes 62 and 64 preferably set the resistance of the PIN diodes 62 and 64 to C/cos θ (when the resistance of the PIN diodes 52 and 54 are set to C/sin θ) or $C/\cos^2 θ$ (when the resistance of the PIN diodes 52 and 54 are set to C/sin θ) (C is a constant, and 0°<θ<90°). Since the resistance of the PIN diodes 62 and 64 is represented as $r=a/i^b$, the control current is preferably set to $|I\cos^{-b}θ|$ or $|I\cos^{-2b}θ|$.

The correction signal output unit 70 outputs a correction signal based upon the first correction signal and the second correction signal. The correction signal output section 70 includes capacitance elements 72, 74, and an amplifier 76.

The capacitance element 72 receives the first correction signal output from the first correction signal output unit 50. The capacitance element 74 receives the second correction signal output from the second correction signal output unit 60. The amplifier 76 receives and amplifies outputs of the capacitance elements 72 and 74, and outputs an amplified signal as the correction signal. It should be noted that the amplifier 76 is a variable amplifier whose gain can be changed. The gain of the amplifier 76 may be fixed, and a variable attenuator which can change the level of attenuation may be connected between the amplifier 76 and the adder 46.

A description will now be given of an operation of the embodiment of the present invention.

The local signal Lo generated by the local oscillator 10 is supplied to the 90°-phase shifter 12. The 90°-phase shifter 12 supplies the divider 22 with the local signal Lo (phase: 0°), and the divider 32 with the orthogonal local signal (phase: 90°).

The divider 22 supplies the 180°-phase amplifier 24 with the local signal Lo (phase: 0°). The 180°-phase amplifier 24 amplifies the local signal Lo (phase: 0°) while shifting the phase thereof by 180°, and supplies the divider 26 with the resulting signal. The divider 26 supplies the 180°-phase amplifier 28 with the supplied signal (phase: 180°). The 180°-phase amplifier 28 amplifies the supplied signal (phase: 180°) while shifting the phase thereof by 180°, and supplies the I signal mixer 42 with the resulting signal. The signal supplied to the I signal mixer 42 has the phase of 0°, and is thus the local signal Lo. The I signal mixer 42 multiplies the local signal Lo and the I signal of the baseband signals, and outputs the resulting signal.

The divider 32 supplies the 180°-phase amplifier 34 with the orthogonal local signal (phase: 90°). The 180°-phase amplifier 34 amplifies the orthogonal local signal (phase: 90°) while shifting the phase thereof by 180°, and supplies the divider 36 with the resulting signal. The divider 36 supplies the 180°-phase amplifier 38 with the supplied signal (phase: 270°). The 180°-phase amplifier 38 amplifies the supplied signal (phase: 270°) while shifting the phase thereof by 180°, and supplies the Q signal mixer 44 with the resulting signal. The signal supplied to the Q signal mixer 44 has the phase of 90°, and is thus the orthogonal local signal. The Q signal mixer 44 multiplies the orthogonal local signal and the Q signal of the baseband signals, and outputs the resulting signal.

When the outputs of the I signal mixer 42 and the Q signal mixer 44 are added by the adder 46, there is provided an operation as an ordinary quadrature modulator. However, in this case, there are generated the initial offset errors (origin offsets). Specifically, there are generated a phase error and an amplitude error. Thus the correction signal is further supplied to the adder 46, and the correction signal is added to the sum of the outputs of the I signal mixer 42 and the Q signal mixer 44. A description will now be given of an operation to generate the correction signal.

The divider 22 supplies the 180°-phase amplifier 23 with the local signal Lo (phase: 0°). The 180°-phase amplifier 23 amplifies the local signal Lo (phase: 0°) while shifting the phase thereof by 180°, and supplies the first correction signal output unit 50 with the phase shift local signal (phase: 180°).

The divider 32 supplies the 180°-phase amplifier 33 with the orthogonal local signal (phase: 90°). The 180°-phase amplifier 33 amplifies the orthogonal local signal (phase: 90°) while shifting the phase thereof by 180°, and supplies the second correction signal output unit 60 with the orthogonal phase shift local signal (phase: 270°).

The divider 26 supplies the 180°-phase amplifier 27 with the supplied signal (phase: 180°). The 180°-phase amplifier 27 amplifies the supplied signal (phase: 180°) while shifting the phase thereof by 180°, and supplies the first correction signal output unit 50 with the local signal Lo (phase: 0°).

The divider 36 supplies the 180°-phase amplifier 37 with the supplied signal (phase: 270°). The 180°-phase amplifier 37 amplifies the supplied signal (phase: 270°) while shifting the phase thereof by 180°, and supplies the second correction signal output unit 60 with the orthogonal local signal (phase: 90°).

In the first correction signal output unit 50, either the PIN diode 52 or 54 is set to the conductive state. In the second correction signal output unit 60, either the PIN diode 62 or 64 is set to the conductive state. The extent of the phase of the correction signal varies according to which PIN diodes are set to the conductive state. Specifically, the following table shows the extents.

TABLE 1

| PIN DIODES IN CONDUCTIVE STATE | PHASE OF CORRECTION SIGNAL |
| --- | --- |
| PIN DIODES 52 AND 62 | 0° < PHASE < 90° |
| PIN DIODES 54 AND 62 | 90° < PHASE < 180° |
| PIN DIODES 54 AND 64 | 180° < PHASE < 270° |
| PIN DIODES 52 AND 64 | 270° < PHASE < 360° |

A description will now be given of operations of the first correction signal output unit 50 and the second correction signal output unit 60 when the PIN diodes 52 and 62 are set to the conductive state, for example.

When the electric potential of the power supply V1 is positive, the control current flows from the other end (power supply V1 side) to the one end (the joint section 56 side) of the control current receiving resistor 58, and the control current flows from the other end (joint section 56 side) to the one end (180°-phase amplifier 27 side) of the PIN diode 52. As a result, the PIN diode 52 is set to the conductive state.

When the electric potential of the power supply V2 is positive, the control current flows from the other end (power supply V2 side) to the one end (the joint section 66 side) of the control current receiving resistor 68, and the control current flows from the other end (joint section 66 side) to the one end (180°-phase amplifier 37 side) of the PIN diode 62. As a result, the PIN diode 62 is set to the conductive state.

Since the operation varies according to the control current caused to flow through the PIN diode 52, a description will be given of respective cases.

(1) Control Current Flowing Through PIN Diode $52 = |I \sin^{-b} \theta|$

In this case, the control current caused to flow through the PIN diode 62 is represented as $|I \cos^{-b} \theta|$. As a result, the resistance r1 of the PIN diode 52 is represented as $r1 = a/i^b = a/(I^b \sin \theta) = C/\sin \theta$. Moreover, the resistance r2 of the PIN diode 62 is represented as $r2 = a/i^b = a/(I^b \cos \theta) = C/\cos \theta$. It should be noted that $C = a/I^b$.

It is assumed that the voltage of the local signal Lo is v1, and the voltage of the orthogonal local signal is v2. It is assumed that both the effective values of v1 and v2 are v. As a result, $v1 = v \cdot \cos \omega t$ and $v2 = v \cdot \sin \omega t$.

Consequently, the effective value of the current flowing through the joint section 56 is represented as $(v/C)\sin \theta$, and the effective value of the current flowing through the joint section 66 is represented as $(v/C)\cos \theta$. A sum of the current flowing through the joint section 56 and the current flowing through the joint section 66 is to be the correction signal. The current effective value of the correction signal is represented as $(v/C) \cdot (\sin \theta + \cos \theta) = (vI^b/a) \cdot (\sin \theta + \cos \theta)$. Thus, it is possible to properly set the current effective value of the correction signal by properly setting I. As a result, it is possible to properly set the current effective value of the correction signal corresponding to the amplitude error.

Moreover, the current of the correction signal is represented as $v1/r1 + v2/r2 = (v \cdot \cos \omega t)/r1 + (v \cdot \sin \omega t)/r2 = (v/C) \cdot (\sin \theta \cos \omega t + \cos \theta \sin \omega t) = (v/C) \cdot \sin(\omega t + \theta)$. Thus, the phase of the current of the correction signal is represented as $\theta$ (where $0° < \theta < 90°$). Thus, it is possible to properly set the phase of the current of the correction signal by properly setting $\theta$. Consequently, it is possible to cancel the phase error, and to properly set the phase of the current of the correction signal.

Since $0° < \theta < 90°$, it is possible to set the phase of the current of the correction signal within the range more than 0° and less than 90°.

(2) Control Current Flowing Through PIN Diode $52 = |I \sin^{-2b} \theta|$

In this case, the control current caused to flow through the PIN diode 62 is represented as $|I \cos^{-2b} \theta|$. As a result, the resistance r1 of the PIN diode 52 is represented as $r1 = a/i^b = a/(I^b \sin^2 \theta) = C/\sin^2 \theta$. Moreover, the resistance r2 of the PIN diode 62 is represented as $r2 = a/i^b = a/(I^b \cos^2 \theta) = C/\cos^2 \theta$. It should be noted that $C = a/I^b$.

It is assumed that the voltage of the local signal Lo is v1, and the voltage of the orthogonal local signal is v2. It is assumed that both the effective values of v1 and v2 are v. As a result, $v1 = v \cdot \cos \omega t$ and $v2 = v \cdot \sin \omega t$.

Consequently, the effective value of the current flowing through the joint section 56 is represented as $(v/C)\sin^2 \theta$, and the effective value of the current flowing through the joint section 66 is represented as $(v/C)\cos^2 \theta$. A sum of the current flowing through the joint section 56 and the current flowing through the joint section 66 is to be the correction signal. The current effective value of the correction signal is represented as $(v/C) \cdot (\sin^2 \theta + \cos^2 \theta) = (vI^b/a) \cdot (\sin^2 \theta + \cos^2 \theta) = vI^b/a$. Thus, it is possible to properly set the current effective value of the correction signal by properly setting I. As a result, it is possible to properly set the current effective value of the correction signal corresponding to the amplitude error. It should be noted that even if the $\theta$ changes, the current effective value of the correction signal does not change.

Moreover, the current of the correction signal is represented as $v1/r1 + v2/r2 = (v \cdot \cos \omega t)/r1 + (v \cdot \sin \omega t)/r2 = (v/C) \cdot (\sin^2 \theta \cos \omega t + \cos^2 \theta \sin \omega t) = (v/C) \cdot (\sin^4 \theta + \cos^4 \theta)^{1/2} \cdot \sin(\omega t + \tan^{-1}(\tan^2 \theta))$. Thus, the phase of the current of the correction signal is represented as $\tan^{-1}(\tan^2 \theta)$ (where $0° < \theta < 90°$). Thus, it is possible to properly set the phase of the current of the correction signal by properly setting $\theta$. Thus, it is possible to properly set the phase of the current of the correction signal for canceling the phase error.

Since $0° < \theta < 90°$, $0° < \tan^{-1}(\tan^2 \theta) < 90°$. Thus, it is possible to set the phase of the current of the correction signal within a range more than 0° and less than 90°.

In this way, when the PIN diodes 52 and 62 are set to the conductive state, it is possible to set the phase of the current of the correction signal in the range more than 0° and less than 90°. Similarly, when the PIN diodes 54 and 62 are set to the conductive state, it is possible to set the phase of the current of the correction signal in the range more than 90° and less than 180°. When the PIN diodes 54 and 64 are set to the conductive state, it is possible to set the phase of the current of the correction signal in the range more than 180° and less than 270°. When the PIN diodes 52 and 64 are set to the conductive state, it is possible to set the phase of the current of the correction signal in the range more than 270° and less than 360°.

In the section above, the description is given of the example to apply the error correction signal generating device to the quadrature modulator 1. However, the error correction signal generating device can solely be utilized as a noise canceller circuit. Moreover, the error correction signal generating device can be applied not only to the quadrature modulator, but also to a phased array antenna.

According to the embodiment of the present invention, the first correction signal output unit 50 sets either the PIN diode 52, which receives the local signal (phase: 0°), or the pin diode 54, which receives the phase shift local signal (phase: 180°), to the conductive state. Moreover, the second correction signal output unit 60 sets either the PIN diode 62, which receives the orthogonal local signal (phase: 90°), or the pin diode 64, which receives the orthogonal phase shift local signal (phase: 270°), to the conductive state.

The phase of the correction signal can thus be set to 0° to 360° by means of the combinations of the PIN diodes which are in the conductive state. As a result, even if the phase error of the quadrature modulator 1 takes a value ranging from 0° to 360°, the phase of the correction signal can be set to cause the correction signal to cancel the phase error.

Further, the resistances of the PIN diodes 52, 54, 62, and 64 can be changed by the control currents, the amplitudes of the correction signals can be set to cause the correction signal to cancel the amplitude error of the quadrature modulator 1.

Moreover, when the resistances of the PIN diodes 52 and 54 are represented as $C/\sin \theta$, and the resistances of the PIN diodes 62 and 64 are represented as $C/\cos \theta$, $\theta$, which is a variable used to determine the control current, is simply the phase of the correction signal. Thus, the phase of the correction signal can be easily set.

Moreover, when the resistances of the PIN diodes 52 and 54 are represented as $C/\sin^2 \theta$, and the resistances of the PIN diodes 62 and 64 are represented as $C/\cos^2 \theta$, even if $\theta$, which is a variable used to determine the control current, changes, the effective value of the correction signal remains unchanged. Thus, the effective value of the correction signal can be easily set.

The invention claimed is:

1. An error correction signal generating device comprising:
   a local signal outputter that outputs a local signal;
   an orthogonal local signal outputter that outputs an orthogonal local signal obtained by shifting the phase of the local signal by 90 degrees;
   a phase shift local signal outputter that outputs a phase shift local signal obtained by shifting the phase of the local signal by 180 degrees;
   an orthogonal phase shift local signal outputter that outputs an orthogonal phase shift local signal obtained by shifting the phase of the orthogonal local signal by 180 degrees;
   a first correction signal outputter that outputs a first correction signal based upon the local signal or the phase shift local signal;
   a second correction signal outputter that outputs a second correction signal based upon the orthogonal local signal or the orthogonal phase shift local signal; and
   a correction signal outputter that outputs a correction signal based upon the first correction signal and the second correction signal,
   wherein said first correction signal outputter comprises:
      a first correction signal passer that passes the first correction signal;
      a local signal switcher that determines whether the local signal is to be passed to said first correction signal passer;
      a phase shift local signal switcher that determines whether the phase shift local signal is to be passed to said first correction signal passer; and
      a first switching controller that sets either said local signal switcher or said phase shift local signal switcher in a conductive state, and
   said second correction signal outputter comprises:
      a second correction signal passer that passes the second correction signal;
      an orthogonal local signal switcher that determines whether the orthogonal local signal is to be passed to said second correction signal passer;
      an orthogonal phase shift local signal switcher that determines whether the orthogonal phase shift local signal is to be passed to said second correction signal passer; and
      a second switching controller that sets either said orthogonal local signal switcher or said orthogonal phase shift local signal switcher in a conductive state.

2. The error correction signal generating device according to claim 1, wherein said phase shift local signal outputter or said orthogonal phase shift local signal outputter is an element that causes the phase of an input signal and the phase of an output signal to have a certain difference in phase regardless of the frequency of the input signal.

3. The error correction signal generating device according to claim 2, wherein the element is an amplifier or a balun.

4. The error correction signal generating device according to claim 1, wherein said local signal switcher, said phase shift local signal switcher, said orthogonal local signal switcher, and said orthogonal phase shift local signal switcher are variable resistor elements.

5. The error correction signal generating device according to claim 4, wherein said local signal switcher, said phase shift local signal switcher, said orthogonal local signal switcher, and said orthogonal phase shift local signal switcher are PIN diodes or variable attenuators.

6. The error correction signal generating device according to claim 4, wherein if the resistance of said local signal switcher or said phase shift local signal switcher is r1, and the resistance of said orthogonal local signal switcher or said orthogonal phase shift local signal switcher is r2, $r1=C/\sin \theta$, and $r2=C/\cos \theta$ (C is a constant, and 0°<θ<90°).

7. The error correction signal generating device according to claim 4, wherein if the resistance of said local signal switcher or said phase shift local signal switcher is r1, and the resistance of said orthogonal local signal switcher or said orthogonal phase shift local signal switcher is r2, $r1=C/\sin^2 \theta$, and $r2=C/\cos^2 \theta$ (C is a constant, and 0°<θ<90°).

8. The error correction signal generating device according to claim 1, wherein said correction signal outputter is connected to said first correcting signal passer and said second correction signal passer.

9. A quadrature modulator comprising:
   an error correction signal generating device comprising:
      a first correction signal outputter that outputs a first correction signal based upon a local signal or a phase shift local signal obtained by shifting the phase of the local signal by 180 degrees;
      a second correction signal outputter that outputs a second correction signal based upon an orthogonal local signal obtained by shifting the phase of the local signal by 90 degrees or an orthogonal phase shift local signal obtained by shifting the phase of the orthogonal local signal by 180 degrees; and
      a correction signal outputter that outputs a correction signal based upon the first correction signal and the second correction signal; and
   an I signal multiplier that multiplies the local signal and an I signal;

a Q signal multiplier that multiplies the orthogonal local signal and a Q signal; and an adder that adds an output from said I signal multiplier, an output from said Q signal multiplier, and the correction signal, and outputs a result of the addition.

10. A quadrature modulator comprising:

an error correction signal generating device comprising:

a local signal outputter that outputs a local signal;

an orthogonal local signal outputter that outputs an orthogonal local signal obtained by shifting the phase of the local signal by 90 degrees;

a phase shift local signal outputter that outputs a phase shift local signal obtained by shifting the phase of the local signal by 180 degrees;

an orthogonal phase shift local signal outputter that outputs an orthogonal phase shift local signal obtained by shifting the phase of the orthogonal local signal by 180 degrees;

a first correction signal outputter that outputs a first correction signal based upon the local signal or the phase shift local signal;

a second correction signal outputter that outputs a second correction signal based upon the orthogonal local signal or the orthogonal phase shift local signal; and a correction signal outputter that outputs a correction signal based upon the first correction signal and the second correction signal;

an I signal multiplier that multiplies the local signal and an I signal;

a Q signal multiplier that multiplies the orthogonal local signal and a Q signal; and an adder that adds an output from said I signal multiplier, an output from said Q signal multiplier, and the correction signal, and outputs a result of the addition.

11. The quadrature modulator according to claim 10, wherein said phase shift local signal outputter or said orthogonal phase shift local signal outputter is an element that causes the phase of an input signal and the phase of an output signal to have a certain difference in phase regardless of the frequency of the input signal.

12. The quadrature modulator according to claim 11, wherein the element is an amplifier or a balun.

* * * * *